Oct. 30, 1934.　　　R. T. FERGUSON　　　1,978,860
MILK BOTTLE HOLDER
Original Filed Nov. 30, 1932　　2 Sheets-Sheet 1
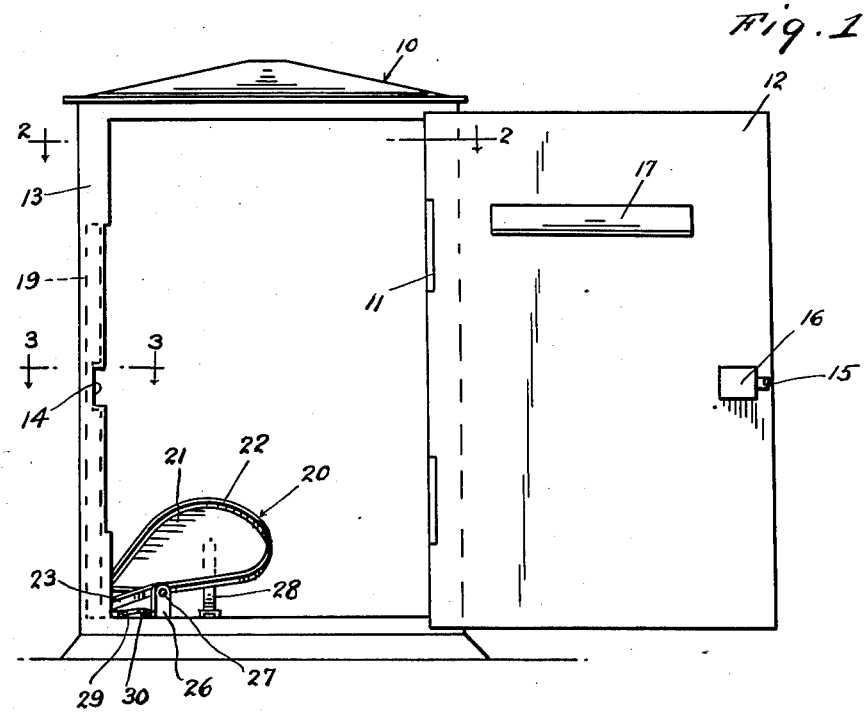
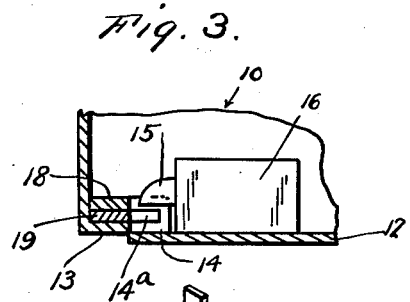
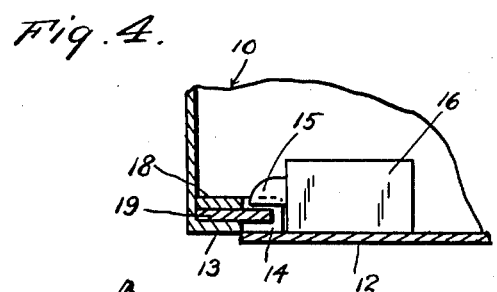
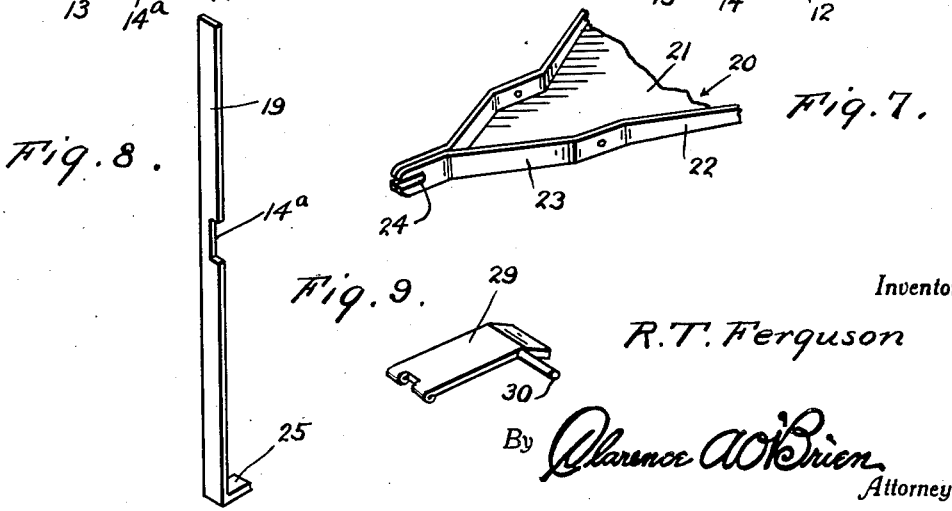
Inventor
R. T. Ferguson
By Clarence A. O'Brien
Attorney

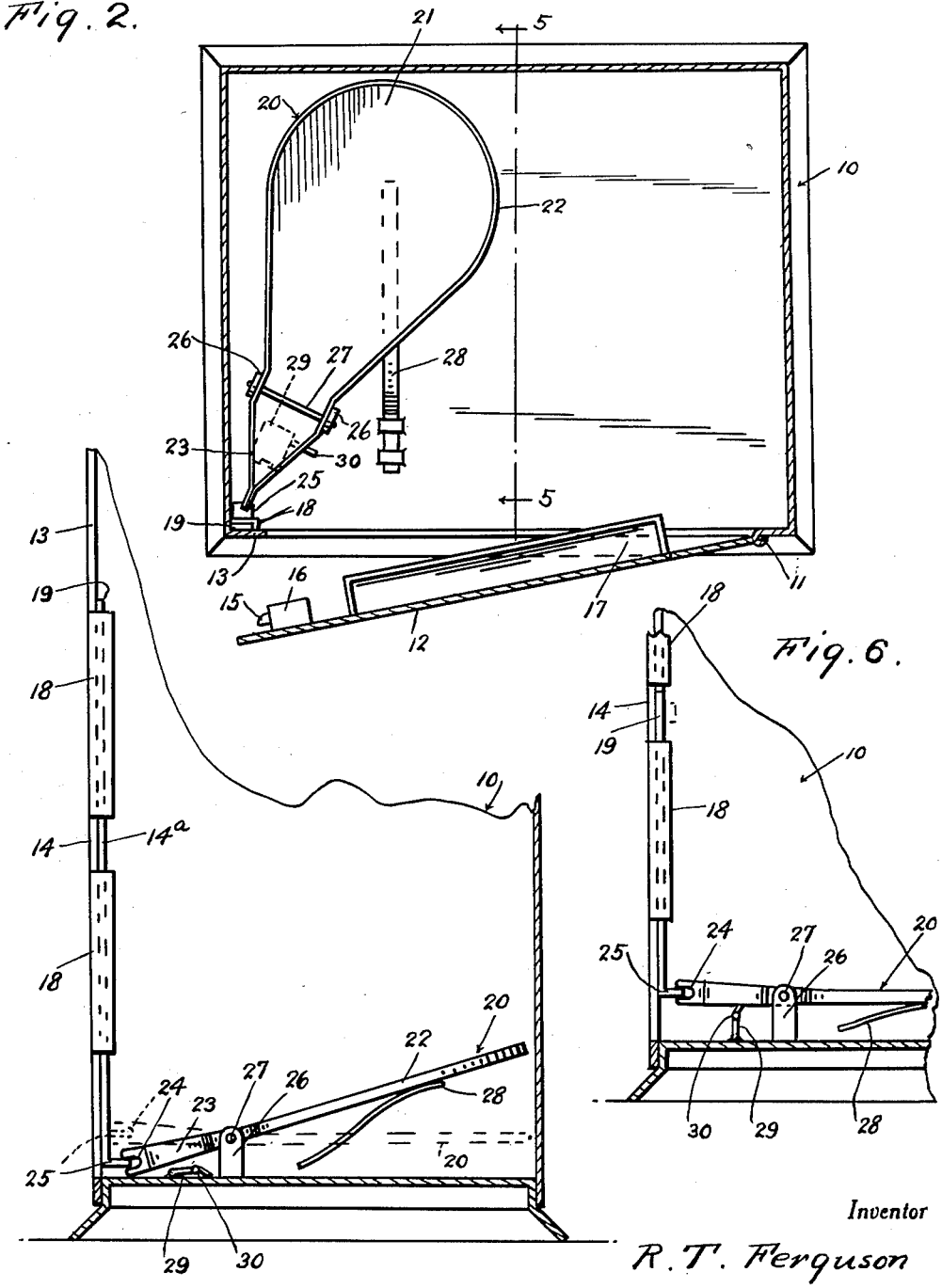

UNITED STATES PATENT OFFICE 1,978,860

MILK BOTTLE HOLDER

Roy T. Ferguson, St. Petersburg, Fla.

Application November 30, 1932, Serial No. 645,060
Renewed March 23, 1934

1 Claim. (Cl. 232—41)

This invention relates to an improved holder for full and empty milk bottles, the same being adapted more particularly for domestic or home use and providing a means whereby a bottle of milk may be confined in an inaccessible place to guard against unauthorized removal of the bottle of milk by thieves.

I am aware of the fact that the field of the invention in which similar milk bottle holders are classified is already well developed. In fact, by way of comparison I am justified in saying that many of these prior art devices utilize cabinets and containers in which the bottle of milk is temporarily stored in an out-of-the-way position under lock and key.

In perfecting the preferred embodiment of the present invention, I also utilize a swingable door-equipped cabinet or casing wherein the principal structural novelty is predicated upon the provision of a practical keeper or retaining bar actuated through the instrumentality of bottle depressed means and properly arranged for co-action with the projectable locking bolt of a suitable key-controlled lock.

Other features and advantages of the invention will become more readily apparent from the following description and drawings.

In the drawings:

Figure 1 is an elevational view observing the door-equipped side of the cabinet and showing certain of the structural novelty located on the interior thereof.

Figure 2 is a horizontal section on the line 2—2 of Figure 1.

Figure 3 is an enlarged detail horizontal section on the line 3—3 of Figure 1.

Figure 4 is a view substantially like Figure 3 showing the retaining position of the locking bolt keeper bar.

Figure 5 is a vertical sectional and elevational view taken approximately on the plane of the line 5—5 of Figure 2.

Figure 6 is a view similar to Figure 5 showing the provision and use of a special latch for maintaining the associated parts in a predetermined position.

Figure 7 is a fragmentary perspective view of one end portion of the depressible bottle actuated tray or pan.

Figure 8 is a perspective view of the slidable keeper bar.

Figure 9 is a perspective view of the aforesaid latch in enlarged detail.

Referring now to the illustrative drawings by distinguishing reference characters, it will be observed that the casing or cabinet is generally denoted by the numeral 10 and this may be of any appropriate shape and proportions to accommodate one or more conventional milk bottles.

Surrounding the open front thereof is a frame and hingedly attached as at 11 to one of the vertical frame bars is a closing door 12. The opposite frame bar may be distinguished as a stop flange 13 and this is provided at a predetermined point with a clearance notch 14 for the projectable bolt 15 of the key controlled lock 16 carried by the door. Incidently, the numeral 17 merely designates a coin receptacle on the inside of the door.

Above and below the notch 14 the flange 13 is provided with bent portions which define stationary guides 18 to accommodate the vertical slidable locking bar or keeper 19. This bar 19 is provided with a bolt clearance notch 14a which is adapted to register with the notch 14 when in the position shown in Figure 1 and is intended to move upwardly out of registration with the notch 14 when in the retaining position shown in Figure 4.

The movement of this retaining bar 19 is accomplished through the instrumentality of a depressible bottle-actuated tray or pan 20. This pan is of appropriate configuration and includes a plate 21 and a surrounding marginal rim 22. In the preferred embodiment the pan is somewhat pear-shaped in top plan view and is gradually decreased in width at one end to assume a substantially V-shaped form as indicated at 23 in Figure 7. The apex portion of this part 23 is formed with a notch 24 and the lower end of the retaining bar 19 is directed laterally as indicated at 25 and the portion 25 is located in the notch 24 whereby to operatively connect the pan and bar together.

The relatively narrow end portion of the depressible pan is located between a pair of upstanding lugs 26 and pivoted in place as indicated at 27 to provide the desired rockable action. The numeral 28 designates a suitable flat spring which is anchored to the bottom of the cabinet and underlies the pan to normally hold the pan in an elevated position as shown in full lines in Figures 1 and 5.

I next call attention to the numeral 29 which designates a simple pivoted latch mounted on the bottom of the cabinet and located to the right of the lugs 26 as shown in Figures 5 and 6 and formed with a finger grip 30. This latch normally assumes the inactive position shown in Figure 5. The latch may however be lifted to the position shown in Figure 6 to engage under the adjacent end portion of the pan to hold the pan in a substantially horizontal position as shown in full lines in Figure 6. This latch is used when there is no weight, such as a bottle of milk, on the pan. In other words, under some circumstances, it is desired to keep the door of the cabinet locked, even though there are no bottles therein, and this is accomplished by simply swinging the latch 29 from the position shown in Figure 5 to the position shown in Figure 6. When in the latter position and when the pan occupies this horizontal state, the retaining bar 19 is elevated so as to disalign the notch 14a from the notch 14, thus causing the imperforate portion of the bar to bridge the notch 14 to provide the desired keeper for the projectable locking bolt 15.

Under normal circumstances, when the pan 20 is not occupied it is lifted to a tilted or elevated position through the instrumentality of the spring 28. At this time the bar 19 is lowered so that both of the notches 14 and 14a are in registry with each other thus providing clearance for passage of the locking bolt 15. By placing a weight, such as a full bottle of milk in the pan, the pan swings down to an approximately horizontal position and in so doing the notched end 24 thereof co-operates with the adjacent finger 25 to lift the retaining bar 19. This shoves the notch 14a up to a point above the notch 14 whereby to provide the desired keeper for the locking bolt 15. This action is evident by comparing Figure 3 with Figure 4.

The gist of the invention is in the provision of an open front bottle receiving cabinet having a hinged door provided with a key-controlled lock wherein the notch 14 of the stop flange 13 serves to co-operate with said projectable locking bolts; together with the pivoted bottle receptive spring-elevated pan having operating connection with a vertically shiftable keeper bar slidably mounted in guides on said flange 13. More broadly stated, however, novelty is predicated upon a movable or slidable keeper in the cabinet for co-operation with the locking bolt and bottle actuated means also in the cabinet for moving the keeper to and from predetermined retaining and releasing position.

It is thought from the foregoing description that the advantages and novel features of the invention will be readily apparent.

It is to be understood that changes may be made in the construction and in the combination and arrangement of the several parts provided that such changes fall within the scope of the appended claim.

I claim:

A milk bottle holder of the class described comprising an open front bottle cabinet formed along one vertical edge with a notched stop flange having internal guides, a keeper bar slidably mounted in said guides and having a notch for registration with said first-named notch, the lower end of said bar being directed laterally to form an actuating finger, a hinged door attached to the open front portion of said cabinet, a conventional bolt-equipped lock carried by said door, the bolt of said lock being co-operable with the aforesaid notches, a pan comprising a plate having a confining rim, means for pivotally mounting said pan in the cabinet, one end portion of the pan being operatively connected with said finger, and a spring in said cabinet underlying the opposite end portion of said pan for normally elevating the pan, when unoccupied, to a tilted position, and a pivoted latch in said cabinet co-operable with the pan to maintain the pan in a predetermined position.

ROY T. FERGUSON.